United States Patent [19]

Amiot

[11] Patent Number: 4,467,707
[45] Date of Patent: Aug. 28, 1984

[54] DOMESTIC COFFEE MAKER

[75] Inventor: Jacques H. J. Amiot, Alencon, France

[73] Assignee: Moulinex, Societe Anonyme, Bagnolet, France

[21] Appl. No.: 480,140

[22] Filed: Mar. 29, 1983

[30] Foreign Application Priority Data

Apr. 9, 1982 [FR] France ................................ 82 06256

[51] Int. Cl.³ ............................................... A47J 31/00
[52] U.S. Cl. ......................................... 99/279; 99/295; 99/299; 251/156
[58] Field of Search ................. 99/295, 299, 300, 304, 99/307, 292, 293, 296, 305, 306, 282, 283, 280, 279; 251/156, 299; 141/152, 367, 368, 359, 362, 360, 361; 426/433

[56] References Cited

U.S. PATENT DOCUMENTS

| | | | |
|---|---|---|---|
| 2,845,964 | 8/1958 | Harland | 141/361 |
| 2,951,431 | 9/1960 | Hugentobler | 99/299 |
| 3,736,155 | 5/1973 | Martin | 99/282 |
| 4,165,681 | 9/1979 | Belinkoff | 99/295 |

Primary Examiner—Robert W. Jenkins
Attorney, Agent, or Firm—Young & Thompson

[57] ABSTRACT

A domestic coffee maker has a water reservoir and a water heater housed in the casing, and tubes for feeding water from the reservoir to the heater, and for feeding hot water to a discharge spout. The spout is arranged above a filter for holding ground coffee in a filter cone, and at the bottom of the filter there is an outflow aperture. A coffee jug is arranged to be supported on the casing to receive coffee flowing from the outflow aperture. A closure valve is provided for the outflow aperture and comprises a stopper carried on a pivotally mounted arm. The arm is displaceable by an opening lever mounted to be movable relative to the casing upon the removal from and positioning of the jug on the casing. When the jug is removed the opening lever displaces the arm such that the outflow aperture is closed by the jug. A manually operable lever is mounted for movement relative to the casing between two positions and is arranged to control the movement of the arm such that the stopper is movable to a small opening position in which it remains partly engaged in the outflow aperture or to a large opening position in which it is moved away from said aperture dependent upon the position of the manually operable lever.

6 Claims, 5 Drawing Figures

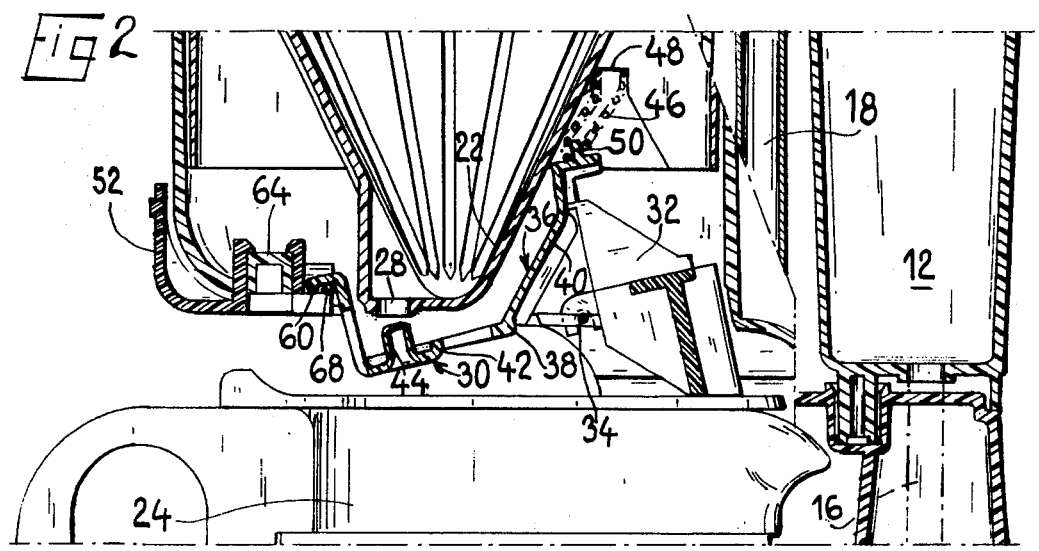
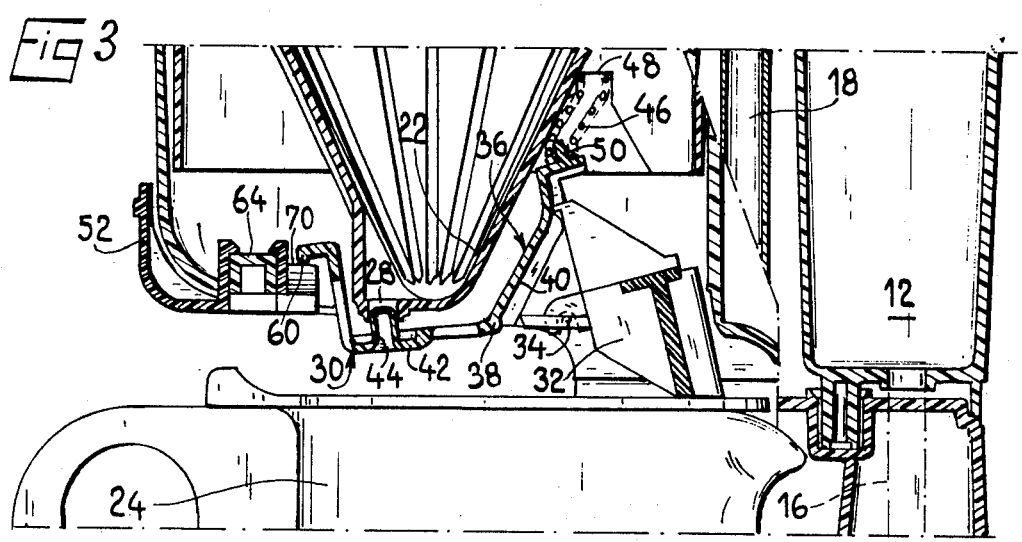
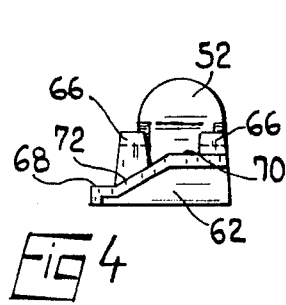
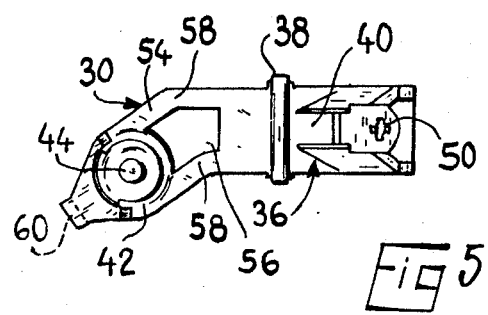

DOMESTIC COFFEE MAKER

BACKGROUND OF THE INVENTION

The present invention relates to domestic coffee makers having a cold water reservoir and a water heater housed in a casing, and tubes for feeding water from the reservoir to the heater and for feeding hot water to a discharge spout mounted above a filter which has an outflow aperture at its bottom, the filter being arranged above a removable infusion container supported on the casing.

Coffee makers of this kind are known, and the outflow aperture may be equipped with a closure valve controlled by an opening lever which is movable relative to the casing. The displacement of the opening lever is caused by the positioning and removal of the infusion container, such that removal of the container causes complete closure of the valve, thus preventing any outflow of liquid in the absence of the container. Positioning the container causes the valve to be opened such that the infusion flows into the container.

It is an object of the present invention to provide a coffee maker in which it is possible to select in a simple and convenient manner the speed of passage of the infusion in order to obtain, with the same amount of ground coffee, a stronger or weaker infusion as desired.

SUMMARY OF THE INVENTION

According to the invention there is provided a domestic coffee maker comprising a casing, a cold water reservoir housed in the casing, a water heater in the casing, first tube means connecting the reservoir and the water heater, a removable infusion container supported on the casing, a filter mounted above the infusion container, a spout mounted above the filter, second tube means connecting the water heater to the spout, and an outflow aperture at the bottom of the filter, wherein the coffee maker further comprises a closure valve for the outflow aperture and an opening lever movable relative to the casing for controlling the closure valve, the opening lever being arranged such that movement of the infusion container causes displacement of the opening lever and hence of the closure valve, removal of the container being arranged to move the opening lever into a position in which the closure valve completely closes the outflow aperture, and wherein the closure valve has an arm pivotally mounted by a pivot axis on the casing, a first part of the arm situated on one side of the axis being arranged to engage the opening lever, a second, operative part of the arm situated on the other side of the axis carrying a stopper for closing the outflow aperture, and further comprising a manual lever mounted for movement relative to the casing and arranged to control movement of the second operative part of the arm, the manual lever being movable between first and second positions, in which, on operation of the opening lever, the stopper is held respectively either in a large opening position or in a small opening position.

When the stopper is in the large opening position, rapid passage of the infusion through the filter is obtained, whereas when it is in its small opening position, the passage of the infusion is slower. Thus, the choice of the speed of passage of the infusion is simply effected by adjusting the position of the movable manual lever.

BRIEF DESCRIPTION OF THE DRAWINGS

An embodiment of the present invention will hereinafter be described, by way of example, with reference to the accompanying drawings, in which:

FIG. 2 shows a partial vertical section of the coffee maker after the infusion container has been placed in position, and shows the closure valve in a first open position for the rapid passage of the infusion;

FIG. 3 is a similar view to FIG. 2, but shows the valve in a second open position for the slow passage of the infusion;

FIG. 4 shows an elevation of the movable hand lever viewed from the interior of the coffee maker, and FIG. 5 is a view from above of the closure valve.

DESCRIPTION OF A PREFERRED EMBODIMENT

Figure 1:
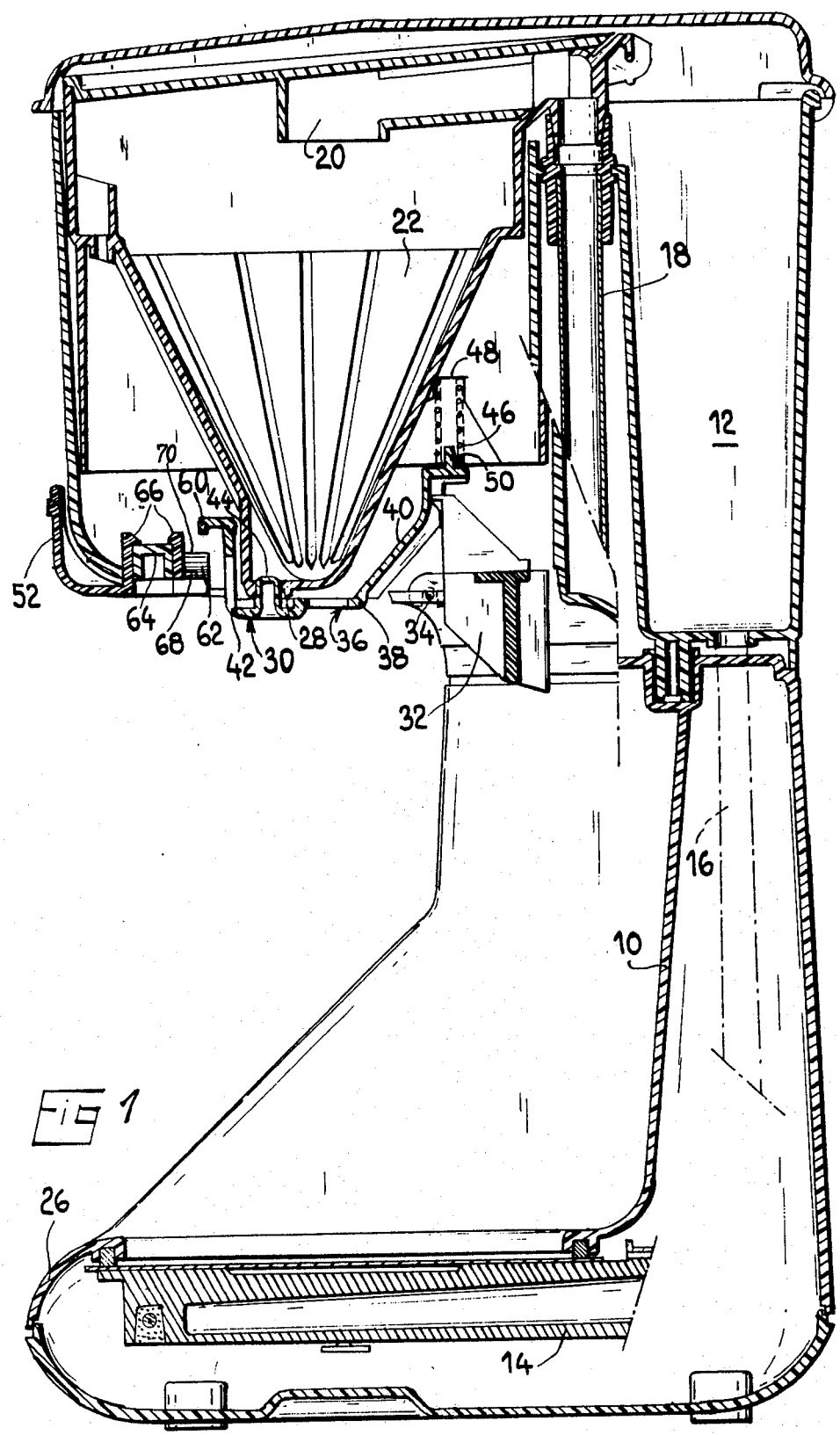
FIG. 1 shows a vertical section of a coffee maker of the present invention with the infusion container removed such that a closure valve completely closes the infusion outflow aperture.

The coffee maker shown in FIG. 1 comprises a casing 10 in which a cold water reservoir 12 is housed. A water heater 14 is fed with water from this reservoir 12 by way of a supply tube diagrammatically indicated at 16. The water heated by the heater 14 is fed, by way of a rising tube 18, to a spout 20. The heated water discharged from the spout 20 drips into a filter 22 which is mounted above an infusion collector container 24.

The infusion container 24 is placed on the upper face of a base 26 of the casing, the water heater 14 being disposed in this base. The filter 22 has the shape of a cone and is adapted to receive a filter paper cone (not shown) in which ground coffee is placed. The filter 22 has an outflow aperture 28 at its bottom, this aperture 28 being opened and closed by way of a closure valve 30. The valve 30 is controlled by a lever 32 which is mounted for pivoting relative to the casing about a horizontal pivot 34. The lever 32 is displaced by positioning the infusion container 24 on the base 26 and by removing the container 24 from the base. The lever 32 is arranged to move the closure valve 30 into its completely closed position shown in FIG. 1 when the container 24 is removed such that outflow of liquid from the aperture 28 is prevented in the absence of the container 24. Similarly, positioning the infusion container 24 on the base 26 causes, by way of the movement of the lever 32, opening of the valve 30 to one of the open positions shown in FIGS. 2 and 3 such that the infusion flows into the container 24.

The valve 30 is provided with an arm 36 which is mounted for pivoting about a horizontal axis 38. A first part 40 of the arm 36 situated on one side of the axis 38 comes into engagement with the lever 32, while a second, operative part 42 of the arm 36 situated on the other side of the axis 38 carries a stopper 44 for closing the outflow aperture 28. The pivoting arm 36 is returned to the complete closure position of the valve by A spring 46 is interposed between a fixed seat 48 and the end 50 of the first part 40 of the arm 36 and is arranged to return the pivoting arm 36 to its position in which the valve 30 completely closes the outflow aperture 28. The operative part 42 of the arm 36 is acted on by a manual lever 52 mounted for movement relative to the casing 10 of the coffee maker, between two positions. In the first position of the lever 52, which is shown in FIG. 2, the stopper 44 is held in a large opening position, whereas in the second position of the lever 52, which is shown in FIG. 3, the stopper 44 is held in a small opening position.

The operative part 42 of the arm 36 has, between the stopper 44 and the pivot axis 38, an elastically deformable portion 54 formed by a local reduction in the section of the arm. In the illustrated embodiment this reduction is obtained by means of a cutout 56 formed between two spaced branches 58 (FIG. 5). The free end of the operative part 42 of the arm carries a nose 60 situated above a stop 62 which is fastened to the manual lever 52 and which has two stop surfaces 68 and 70 at different levels. The lever 52 is horizontally slidable on a fixed rail 64, the lever 52 having lugs 66 arranged to grip around the rail 64 and thereby suspend the lever 52. The two stop surfaces 68 and 70 of the stop 62 are in the form of two spaced horizontal bearing surfaces connected together by an inclined surface 72, as can be seen from FIG. 4.

The nose 60 of the arm 36 comes to rest on one of the surfaces 68 or 70 of the stop 62 dependent upon the position of the lever 52. Thus, sliding the lever 52 changes the stop surface positioned beneath the nose 60. In the large opening position shown in FIG. 2, the nose 60 is supported on the lower surface 68, whilst in the small opening position illustrated in FIG. 3, the nose 60 rests on the upper surface 70.

Thus, when the lever 32 is operated by placing the infusion container 24 in position, the stopper 44 will be moved away from the outflow aperture 28 until the nose 60 abuts a surface of the stop 62 and the distance the stopper moves is determined by which of the stop surfaces is positioned beneath the nose 60. Thus, if the stop 62 is in the large opening position, the nose 60 will abut the lower surface 68, and this position enables rapid passage of the infusion through the aperture 28. If the stop 62 is in the small opening position, the nose 60 will abut the upper surface 70 and the stopper 44 will be partly engaged in the outflow aperture 28, thus causing upward flexion of the elastically deformable portion 54.

Removal of the infusion container 24 frees the lever 32 and consequently the valve 30. The valve then returns to its completely closed position shown in FIG. 1 through the action of the spring 46. It will be seen that the valve is returned to the completely closed position from both the large opening position shown in FIG. 2 and the small opening position shown in FIG. 3.

I claim:

1. Domestic coffee maker comprising a casing, a cold water reservoir housed in the casing, a water heater in the casing, first tube means connecting the reservoir and the water heater, a removable infusion container supported on the casing, a filter mounted above the infusion container, a spout mounted above the filter, second tube means connecting the water heater to the spout, and an outflow aperture at the bottom of the filter, wherein the coffee maker further comprises a closure valve for the outflow aperture and an opening lever movable relative to the casing for controlling the closure valve, the opening lever being arranged such that movement of the infusion container causes displacement of the opening lever and hence of the closure valve, removal of the container being arranged to move the opening lever into a position in which the closure valve completely closes the outflow aperture, and wherein the closure valve has an arm pivotally mounted by a pivot axis on the casing, a first part of the arm situated on one side of the axis being arranged to engage the opening lever, a second, operative part of the arm situated on the other side of the axis carrying a stopper for closing the outflow aperture, and further comprising a manual lever mounted for movement relative to the casing and arranged to control movement of the second operative part of the arm, the manual lever being movable between first and second positions, in which, on operation of the opening lever, the stopper is held respectively either in a large opening position or in a small opening position.

2. A coffee maker according to claim 1, wherein said operative part of the arm has an elastically deformable portion between the stopper and the pivot axis, and a nose is carried at the free end of said operative part, and wherein a stop is fastened to the manual lever, the stop having first and second stop surface at different levels, and wherein, when the manual lever is in its first position, the first stop surface which is at a lower level is placed under said nose, and when the manual lever is in its second position, second stop surface which is at an upper level is placed under said nose, such that when the opening lever is operated the stopper is moved away from the outflow aperture until the nose abuts one of the stop surfaces to thereby determine the distance of the stopper from the outflow aperture, when the manual lever is in its first position, the nose abuts the first, lower stop surface and the stopper is moved to a large opening position, whereas when the manual lever is in its second position, the nose abuts the second, upper stop surface and the stopper is moved to a small opening position in which it is partly engaged in the outflow aperture.

3. A coffee maker according to claim 2, wherein the elastically deformable portion of the arm is formed by local reduction in the section of said arm.

4. A coffee maker according to claim 3, wherein the reduction in the section is obtained by means of a cutout formed between two spaced branches.

5. A coffee maker according to claim 2, wherein the manual lever is mounted to be horizontally slidable, and the first and second stop surfaces of the stop are in the form of two spaced horizontal bearing surfaces connected together by an inclined surface.

6. A coffee maker according to claim 1, wherein a spring is mounted between a fixed seat and the end of said first part of the arm and is arranged to return said arm to the position in which the closure valve completely closes said outflow aperture.

* * * * *